United States Patent [19]

Sakamoto et al.

[11] Patent Number: 4,786,944
[45] Date of Patent: Nov. 22, 1988

[54] COMPOSITE IMAGE PRINTING METHOD AND APPARATUS

[75] Inventors: Kiichiro Sakamoto; Liyoshi Yamaguchi, both of Kanagawa; Yuji Oshikoshi, Tokyo, all of Japan

[73] Assignee: Fuji Photo Film Co., Ltd., Kanagawa, Japan

[21] Appl. No.: 13,278

[22] Filed: Feb. 10, 1987

[30] Foreign Application Priority Data

| Feb. 10, 1986 | [JP] | Japan | 61-25929 |
| Mar. 25, 1986 | [JP] | Japan | 61-64892 |
| Mar. 25, 1986 | [JP] | Japan | 61-64893 |
| Mar. 27, 1986 | [JP] | Japan | 61-67247 |

[51] Int. Cl.$^4$ .............................................. G03B 27/72
[52] U.S. Cl. .......................................... 355/20; 355/43
[58] Field of Search ..................... 355/40, 39, 64, 66, 355/20, 54, 43; 354/109, 110

[56] References Cited

U.S. PATENT DOCUMENTS

| 4,029,412 | 6/1977 | Spence-Bate | 355/64 |
| 4,067,650 | 1/1978 | Spence-Bate | 355/66 X |
| 4,496,983 | 1/1985 | Takenaka | 358/80 |

Primary Examiner—L. T. Hix
Assistant Examiner—D. Rutledge
Attorney, Agent, or Firm—Young & Thompson

[57] ABSTRACT

A composite image printing method and apparatus for making a print of a composite image comprising a scene or human figure and computer graphics and/or letters, in order, for example, to provide a postcard with a picture. The apparatus has an exposure system for exposing a photographic paper to a photographic image such as scenes and human figures on a photographic original, another exposure system including a CRT display device for exposing the photographic paper to an image such as letters and computer graphics displayed on the CRT screen, and a device for successively using the exposure systems so as to print the composite image on the photographic paper.

16 Claims, 5 Drawing Sheets

COMPOSITE IMAGE PRINTING METHOD AND APPARATUS

BACKGROUND OF THE INVENTION

This invention relates to a composite image printing method and apparatus for making a print of a composite image used as a postcard or the like.

For making a print with a composite image of a scene and letters, it is known to use a CRT image printing apparatus in which the scene and letters are composed with the aid of a computer and displayed on the screen of a CRT display device as a composite image to be printed on a photographic paper. For this image composition, the scene is input in the apparatus as video signals, for example, by a TV camera, and letters are provided as images on the CRT screen by operating a keyboard.

In the above-described CRT image printing apparatus, a composite image is produced electrically to be displayed on the CRT screen. Such image composition is attended with the problem that an image which is displayed on the CRT screen by being picked up by a TV camera or the like from a photographic original such as a negative film, positive film, a print and so on is worsened as to gradation, color tone, resolution, etc.

In the photographic field, there have been various kinds of printing apparatus for making a print from an image recorded on a film. Such conventional printing apparatus can be used to make a print of a composite image. In this case, however, it is necessary to photograph previously a composite image to be printed, resulting in a time-consuming and troublesome operation. Composing letters, a computer graphic image and/or the like with a photographed image is effected easier by electrical display on a CRT display device than by photography. In particular, it is well known in computer graphics that a print of good quality can be better made by exposing a photographic paper directly to a composite image displayed on the screen of the CRT display device than from a photographed composite image on a film.

Another problem is the prior confirmation of a composite image to be printed. When composing images, it is necessary to confirm a composite image as to its locational arrangement and image quality prior to printing. This prior confirmation is important in order to avoid misprinting. If in fact there is an undesirable composite image, the images to be composited should be changed in size, location and the like.

There is a further problem, in particular, in a postcard with a sender's name and address printed upon it. Although the letters showing the sender's name and address are usually displayed on the CRT screen for printing, no sharp image of the letters is provided because these letters are usually small.

OBJECTS OF THE INVENTION

It is, therefore, an object of the present invention to provide a method and apparatus for making a print of a composite image of good quality by an easy operation.

It is another object of the present invention to provide a method and apparatus for making a print of a composite image which allows confirming the composite image to be printed prior to printing.

It is still another object of the present invention to provide a method and apparatus for making a print of a composite image in which the printed image quality is not worsened.

It is a further object of the present invention to provide a method and apparatus for making a print of a composite image in which images to be composed and printed can be changed in size and location.

It is a still further object of the present invention to provide a method and apparatus for making a print of a composite image which allows printing small letters sharply.

SUMMARY OF THE INVENTION

In accordance with the present invention, the composite image printing method and apparatus comprises means for exposing a photographic paper to a photographic original image recorded on a photographic original such as a negative film, a positive film, a print, etc., means including a CRT display device for exposing the photographic paper to a CRT image displayed on the CRT screen, and means for effecting the photographic paper exposures successively so as to produce a latent composite image of the photographic original image and CRT image on the photographic paper.

According to a feature of the present invention, the photographic original image exposure means is disposed opposite an exposure station wherein the photographic paper is held flat, and the successive exposure effecting means, which is desirably a mirror, is adapted to be removably placed between the exposure station and the photographic original image exposure means so as to optically confront the CRT image exposure means.

There is means for compositely projecting the photographic original image and the CRT image onto a monitor screen prior to printing, in order to allow a prior confirmation of a composite image to be printed. This projecting means is desirably a half-mirror adapted to be positioned in place of the successive exposure effecting means, namely a mirror.

According to another feature of the present invention, each exposure means includes means for trimming an image so as to provide a composite image to be printed in which no overlapping occurs between two images. As this trimming means, there is provided an electric mask for the CRT display device and a mechanically changeable mask for the photographic original image exposure means. The provision of this trimming means makes it possible to avoid undesirable overlapping of the images to be composed, thereby to provide a print of a composite image without worsening the image quality of it.

When it is necessary to print small letters such as a name and address together with a photographic original image and/or a graphic image, according to the present invention, a plate on which small letters are written is attached to the screen of the CRT display device so as to be illuminated by the CRT display device as a light source. The provision of this letter plate allows printing small letters sharply on the photographic paper.

BRIEF DESCRIPTION OF THE DRAWINGS

These and other objects and features of the present invention will become apparent from the following detailed description of preferred embodiments with reference to the accompanying drawings, in which.

DETAILED DESCRIPTION OF THE INVENTION

Figure 1:
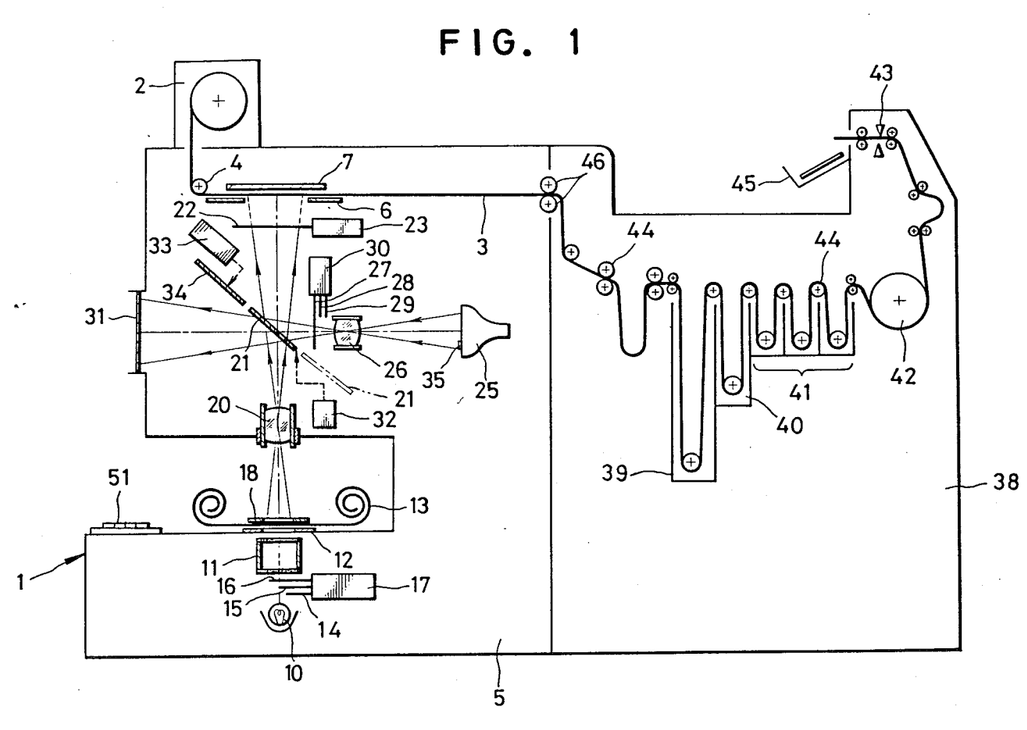
FIG. 1 is a schematic illustration of the apparatus of the present invention.

Referring now to the drawings in more detail, and particularly FIG. 1, there is shown a specific embodiment of the present invention which is applied to printing postcards.

The composite image printing apparatus generally comprises an exposure chamber 5 and a processing chamber 38 arranged in a main housing 1. At the top on the left hand side of the housing 1, there is a photographic paper magazine 2 detachably mounted thereon wherein a roll of color photographic paper 3 is loaded. The color photographic paper 3 is intermittently withdrawn from the magazine 2 to an exposure position about a guide roller 4 by a pair of nip rollers 46, and is held flat between an exposure mask 6 and a pressure plate 7 at the exposure position. In the exposure chamber 5, there are a photographic image exposure system for exposing the photographic paper 3 to an image recorded on a color original such as a color negative film, a color positive film, a color print and the like, and a CRT image exposure system for exposing the photographic paper 3 to an image displayed on the screen of a CRT, the CRT image comprising letters spelling out a message such as a greeting, a name and address, etc., and/or a computer graphic image.

As the photographic image exposure system, there are disposed near the bottom of the exposure chamber 5 a lamp 10 capable of emitting white light, a mirror box 11 having a box-like shape for the white light from the lamp 10, and means such as a negative carrier 12 adapted to place a transparency such as a color negative film 13 in a position to be illuminated from below. As is well known, the mirror box 11 has its inside walls of mirror surface and light-diffusing plates covering its top and bottom openings. Between the lamp 10 and the mirror box 11 there is a light component adjusting device comprising three color filters, namely a cyan, a magenta and a yellow filter 14, 15 and 16 for controlling the three color components, namely red, green and blue, of the white light from the lamp 10. The three color filters 14 to 16 are selectively inserted into the path of the white light, the amount of insertion of each color filter 14, 15, 16, being adjusted under the control of a filter control device 17 so as to regulate the quality of the white light in accordance with the tone of the image on the color negative film 13. It is desirable to press down the color negative film 13 against the negative carrier 12 by a masking device 18 in any well known manner so as to maintain the color negative film 3 flat during exposure. When making a print from reversal films or prints on which positive images are recorded, it is necessary to use a color reversal photographic paper as well as to display a positive image on the screen of the CRT display device. In either case, the exposure control is reversed relative to the case of using negative films. It is also necessary to illuminate the print from above.

Above the negative carrier 12 there is a zoom lens 20 as a printing lens so mounted on the housing 1 as to form an image of the negative film 13 on the color photographic paper 3 when a half-mirror 21 which will be described later is out of the optical path of the zoom lens 20 and a shutter 22 is opened. This zoom lens 20 is manually variable in focal length so as to form a variety of magnifications of images, namely enlarged and reduced images. Of course, the zoom lens 20 can be automatically operated under the control of an electric motor with a magnification control circuit which is well known in the art per se to vary its focal length. If desirable, the zoom lens 20 may be replaced with a plurality of printing lenses mounted in a turret disk which are different in focal length from each other.

The shutter 22 which is adapted to open and close under the control of an exposure controller 23 is caused to open and close only once for a period of time that varies with the speed or sensitivity of the color photographic paper 3 when making an exposure through the photographic image exposure system, but to open and close three times, once for each color, namely blue, green and red, when making an exposure through the CRT image exposure system. The three times of exposure results from the fact that a black-and-white CRT is used for the CRT in order to increase resolution. By contrast, a color CRT, if used, allows making a single exposure.

On the right-hand side of the half-mirror 21 is a black-and-white CRT display device (which is hereinbelow referred to as a black-and-white CRT for simplicity) 25 with its associated printing lens 26 and color filters 27 to 29 for the above-mentioned CRT image exposure system. This CRT 25 can display on its screen a color negative image to be printed as a black-and-white image in the form of a brightness pattern for, upon monitoring, the color negative image and for, upon actually printing, every monochromatic image, namely the blue, green, red images of the color negative image, for a predetermined period of time, for example approximately one second. The display of the three monochromatic images is performed in sequence.

The black-and-white CRT 25 has a high luminance characteristic for making the exposure time of the color photographic paper as short as possible. It should be noted that the screen of the black-and-white CRT contains a mixture of fluorescent substances P45 and P22 in the ratio between 1:3 and 1:5, preferably in the ratio of 1:4. The black-and-white CRT 25 thus has a fluorescent luminosity which is generally high in the wavelength range of red and low in the wavelength range of blue. As a result, although the color photographic paper 3 has a low spectral sensitivity to red and a relatively high spectral sensitivity to blue, the exposure time is considerably reduced to approximately one second for red, which is almost equal to that of blue, resulting in well-color-balanced prints.

As previously described, the black-and-white CRT displays on its screen a black-and-white image in the form of a brightness pattern for each of the three monochromatic images upon printing. Actually, each black-and-white image is converted into a corresponding monochromatic image with the aid of one of three primary color filters, namely red, green and blue color filters 27 to 29 which are selectively sequentially inserted between the printing lens 26 and the half-mirror 21 under the control of a filter changeover device 30.

Although the black-and-white CRT 25 has an advantage in applications wherein it is necessary to make a print of a large letter without decreasing image quality, and although it is easy to provide a letter image on the screen of the black-and-white CRT 25, nevertheless the CRT is unsuitable for printing a sharp and small letter image, because the edges of a small letter image are burred on the screen of a CRT. For this reason, in this embodiment, there is provided a plate 35 with small letters removably attached to the screen of the black-and-white CRT 25. This plate 35 is illuminated by the black-and-white CRT 25 so as to project the image of its letters onto the color photographic paper 3.

The letter plate 35 can be easily prepared by printing an image of an original on a lithographic negative film. When using the lithographic negative film as the letter plate 35, as there are transparent letters thereon, the printed letters are dyed black. If a colored letter is desired, the letter plate 35 may be either overlaid with a filter of the same color or illuminated with the same color of light produced by the CRT display device. As is well known in the art, when forming black letters on a transparent background on the lithographic negative film, colorless letters appear on a black background on a print. It is of course permissible to use as the letter plate either transparent or opaque plastic sheets.

The half-mirror 21 is removably insertable across the optical axes of the printing lenses 20 and 26 at the junction thereof at an inclination of 45° relative to each of the optical axes. Specifically, the half-mirror 21 is moved by a driving device 32 such as a solenoid, between an nserted position shown in full line and a removed position shown by a double dotted line in FIG. 1. In the inserted position, the half-mirror 21 functions, on the one hand, to reflect an image projected by the printing lens 20 and, on the other hand, to transmit an image projected by the printing lens 26, thereby directing both images toward a transmitting type of screen 31 mounted on a front wall of the housing 1 so as to display thereon both images overlapped as a composite image which is the same image as that to be printed on the photographic paper 3.

This composite image on the screen 31 is observed from the outside by an operator to determine whether the composite image is properly arranged. If there is an undesirable composite image displayed on the screen 31, a keyboard 51 is operated to recompose the undesirably composed image. The recomposition of the images can be performed by modifying the original images to be projected. For this modification, the original image on the screen of the black-and-white CRT 25 is changed, for example, in size, location, color balance and/or density.

Furthermore, it is desirable to change the size and location of an electric mask when an insertion composing method is used. For the original image projected from the color negative film 13, one can move the negative carrier 12 while holding stationary the color negative film 13 and/or one can change the mask 18 in size and/or location.

Although, in order to reduce exposure time, it is generally considered better for the black-and-white CRT 25 to have a high luminosity, it is desirable to reduce the luminosity to a certain degree sufficient to provide a clear image on the screen 31 for confirmatory observation. This reduction of luminosity prolongs the life of the black-and-white CRT 25. In this case, because the image projected by the lamp 10 will be too bright relative to the image displayed on the screen of the black-and-white CRT 25, making observations is difficult, and so the lamp 10 should be dimmed in accordance with the reduced luminosity.

Upon actually printing the image displayed on the screen of the black-and-white CRT 25, a mirror 34 is positioned by a driving device 33 where the half-mirror 21 was previously located. It is permissible to mount the half-mirror 21 and the mirror 34 in the same turret disk in any well known manner.

In the processing chamber 38 on the right-hand side of the housing 1, there is an automatic print processor comprising a color developing tank 39, a bleaching-fixing tank 40, a washing tank 41, a dryer drum 42, a cutter 43, and a plurality of automatic conveying rollers 44 disposed therebetween. The exposed color photographic paper 3 is automatically passed through these tanks in succession, dried and then cut frame by frame. Prints with a positive image thus finished are discharged into an external tray 45. The dryer drum 42 can be replaced with a well-known hot-air blower.

Figure 2:
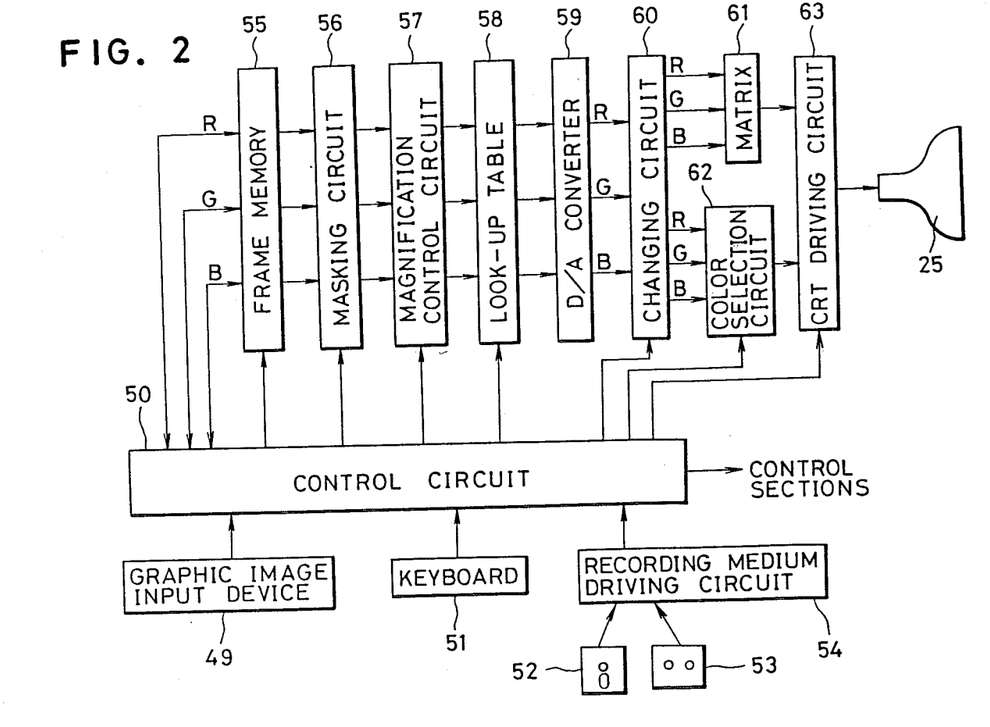
FIG. 2 is a schematic block diagram showing a CRT image exposure system which is a part of the apparatus of the present invention.

Referring now to FIG. 2, there is shown a circuit in the form of a block diagram for the CRT image exposure system. As a graphic image input device 49, a digitizer well known in the art per se can be used to input a computer graphic image into a control circuit 50. There is a keyboard 51 through which personal data such as names, addresses and so on as well as instructions are input to control associated working parts. There is also a driving circuit 54 for retrieving computer graphic images recorded in the form of video signals on a recording medium, for example a floppy disk 52 or a magnetic tape 53, and for entering the retrieved video signals into the control circuit 50. The control circuit 50 is adapted to compose electrically the images of letters input through the keyboard 51 and the computer graphic image input through the graphic image input device 49.

Video signals of each image in the control circuit 50 are logarithmically transformed and subjected to a color correction, and then separated by color and stored as color signals in a frame memory 55. The color signals, when monitoring or printing the image, are retrieved from the frame memory 55 to be transmitted to a masking circuit 56 which electrically masks unnecessary parts of the image, namely avoids color signals corresponding to the unnecessary parts of the image so as to display the image without the unnecessary parts on the screen of the black-and-white CRT 25. This electrical masking can be changed in size and/or location by entering instructions through the keyboard 51. On the other hand, an image can be displayed in different sizes and/or positions on the screen of the black-and-white CRT 25, to store the color signals of an image in different locations in the frame memory 55 through operation of the keyboard 51.

The color signals after having been masked in the masking circuit 56 are transmitted to a magnification control circuit 57 in order to vary the magnification of the image to be displayed on the screen of the black-and-white CRT 25, that is, to enlarge or reduce it. After this varying of magnification, the color signals are transmitted to a look-up table 58 to be corrected in accordance with the gradient characteristics of the color photographic paper 3 and reversed fro negative to positive therein. It should be noted that no reversal is required when a color reversal photographic paper is used.

The color signals from the look-up table 58 are then converted, by D/A converter 59 into analog color signals which in turn are transmitted either to a matrix circuit 61 upon monitoring the positively reversed image or a color selection circuit 62 upon printing, through a changing circuit 60. In the matrix circuit 61 brightness signals are calculated based on the color signals, more specifically, red (R), green (G), and blue (B) color signals and directed toward a CRT driving circuit 63. On the other hand, the color selection circuit 62 selects any one color signal of the three color signals to be transmitted to the CRT driving circuit 63.

The CRT driving circuit 63 drives the black-and-white CRT 25 to display on its screen a black-and-white image which is mirror-image reversed between monitoring and printing. The reason for this mirror-image reversal is that the image projected by the photographic image and the CRT image exposure system are both reversed: the image projected by the photographic image exposure system is reversed by the half-mirror 21 upon monitoring and the image projected by the CRT image exposure system is reversed by the mirror 34 upon printing. In order to correct the images, the CRT driving circuit 63 is adapted to cause the black-and-white CRT 25 to scan on its screen in a normal direction, namely from right to left, upon monitoring, and in the opposite direction to the normal scanning direction for exposure. For displaying a mirror image on the screen of the black-and-white CRT 25, it is permissible to read out the color signals in the frame memory 55 in the direction opposite to the normal read-out direction, e.g. from end to start.

The control circuit 50 which comprises a central processing unit (CPU) is adapted to control the operations of the photographic image exposure system and the processing devices in the processing chamber 38 as well as those of the CRT image exposure system.

Figure 3:
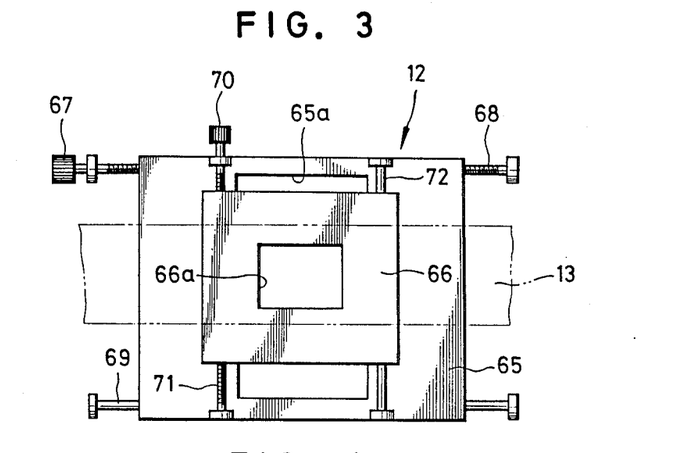
FIG. 3 is a plan view of a negative carrier used in a photographic original image exposure system.

FIG. 3 shows an example of the negative carrier 12 which comprises a movable base plate 65 and a negative film holding plate 66 movably mounted on the base plate 65, these plates 65 and 66 being interconnected to provide two-dimensional movements of the color negative film 13. Specifically, the base plate 65 is mounted on a screw rod 68 having a knob 67 at its one end and on a guide rod 69 so as to be movable to the right or left along the guide rod 69 upon rotation of the screw rod 68. The base plate 65, which is opaque, has an opening 65a for allowing the illumination light to pass therethrough. On the other hand, the negative film holding plate 66 is mounted on a screw rod 71 having a knob 70 at its one end and on a guide rod 72 so as to be moved up and down along the guide rod 72 by the rotation of the screw rod 71. This negative film holding plate 66, which is also opaque, is formed with an opening 66a for allowing the illumination light that has passed through the base plate 65 to pass also therethrough.

Figure 4:
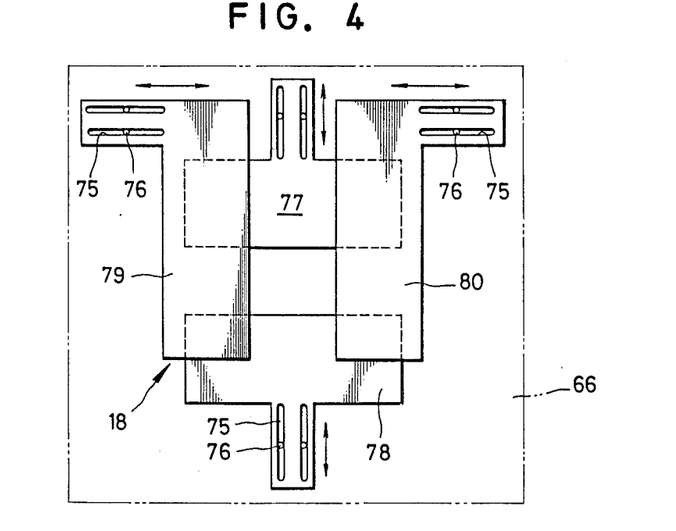
FIG. 4 is an enlarged plan view of a variable mask used in a photographic original image exposure system.

FIG. 4 shows an example of the masking device 18 of variable masking area. This masking device 18 comprises four opaque plates 77 to 80 adapted to move independently rectilinearly, thereby to define and change an opening enclosed within the inside edges of the four opaque plates 77 to 80 as to its size and location. This rectilinear movement of each opaque plate 77, 78, 79, 80 is guided by a combination of slots 75 and pins 76. It should be noted in this example that the pins 76 are fixedly mounted on the negative film holding plate 66 of the negative carrier 12.

A further understanding of the method of making prints with a composite image by the printing apparatus of the present invention will be had from the following description referring to FIGS. 1 and 5 through 7.

For preparing a CRT image, the images from the graphic image input device 49, the keyboard 51 and the floppy disk 52 or magnetic tape 53 are composed as occasion demands and stored in the frame memory 55 by color. On the other hand, the color negative film 13 with frames of figure images, scenery images and so on is put on the negative carrier 12 in the photographic image exposure system. If it is necessary to compose an image of small letters, the letter plate 35 is placed on or in front of the screen of the black-and-white CRT 25. In the photographic image exposure system, the color filters 14 to 16 are laced in a predetermined standard position so as to regulate the light from the lamp 10, providing a standardized quality of illumination light. As the half-mirror 21 is disposed on the optical axis of the photographic image exposure system when monitoring, a part of the light that has passed through the printing lens 20 is reflected by the half-mirror 21 and directed to the screen 31, forming an image of the color negative film 13 thereon, while the remaining part of the light passes therethrough. On the other hand, in the CRT image exposure system, the changing circuit 60 transmits three-color signals to the matrix circuit 61 when monitoring.

As was previously described, each color signal to be transmitted is an analog signal into which the D/A converter 59 converts a color signal read out from the frame memory 55 after having reversed the same from negative to positive in the look-up table 58. The matrix circuit 61 provides brightness signals based on the respective signals which in turn are transmitted to the CRT driving circuit 63 to display a black-and-white image on the screen of the black-and-white CRT 25 whose luminosity is intentionally reduced to a level lower than when printing.

As was also previously described, the CRT image which is displayed in mirror-image relationship to that displayed when printing, is projected onto the screen 31. Simultaneously, the plate 35 on which small letters are recorded is illuminated using the black-and-white CRT 25 as an illumination light source so as to project the image of the plate 35. As a result, on the screen 31 there is displayed an optically composed image of the images provided by the color negative film 13, the black-and-white CRT, and the plate 35.

Before printing, the composite image on the screen 31 is subjected to visual inspection to determine whether the composite image is properly arranged. If in fact there is an improper composite image on the screen 31, the keyboard 51 is operated to adjust the two-dimensional position of the image on the screen of the black-and-white CRT 25 and/or to change the size and location of the electrical masking in the masking circuit 56. It may also be desirable to vary the size of the image to be displayed on the black-and-white CRT 25 by the magnification control circuit 57 which also is operated through the keyboard 51. Alternatively, the printing lens 26 may be changed in magnification in order to change the size of the image to be projected onto the screen 31.

On the other hand, if in fact it is decided that the image provided by the color negative film 13 is improperly positioned on the screen 31, the knobs 67 and 70 are turned independently to move the negative carrier 12 in any desired direction, so as to place the color negative film 13 in a proper position. In this way, the image provided by the color negative film 13 can be projected in a desirable position onto the screen 31. Furthermore, if the image needs to be trimmed, the opaque plates 77 to 80 are moved to adjust and shift the opening defined thereby so as to vary the area to be masked. It is also desirable to vary the focal length of the printing lens 20 so as to change the magnification of the projected image.

When the composite image is properly arranged on the screen 31, an instruction is entered through the keyboard 51 to start an actual printing of the composite image. The control circuit 50 acts to expose the color photographic paper 3 to the photographic image and the CRT image by multiple exposure, thereby to produce a latent image of the composite image thereon. Specifically, upon the exposure of the color photographic paper 3 to the photographic image, the filter control device 17 adjusts the amount of insertion of each color filter 14, 15, 16 into the optical path in accordance with the corresponding color density of the photographic image. After this filter adjustment, the lamp 10 is caused to produce its rated emission followed by the removal of the half-mirror 24 from the optical axis by the driving device 32. The shutter 22 is then opened for a predetermined period of time under the control of the exposure controller 23 to allow the color photographic paper 3 to be exposed to the photographic image projected by the printing lens 20. After the predetermined period of time, the color filters 14 to 16 are returned to their initial position. At this time, the lamp 10 is turned off until the completion of exposure of the color photographic paper 3 to the CRT image.

The CRT image exposure system is next actuated to start the corresponding exposures. First, the black-and-white CRT 25 is driven to be bright. Simultaneously, the driving device 33 is caused to insert the mirror 34 into the optical path of the printing lens 26 so as to direct the CRT image toward the color photographic paper 3, and the changing circuit 60 renders the color selection circuit 62 active. The color selection circuit 62 transmits first the red color signals to the CRT driving circuit 63 to drive the black-and-white CRT, displaying a black-and-white image in the form of a brightness pattern for the red monochromatic image. As was previously noted, upon printing with the CRT, driving circuit 63 drives the black-and-white CRT 25 to scan on its screen in the direction opposite to the scanning direction on monitoring, displaying on the screen an image which is the mirror image of the image displayed thereon when monitoring. During the display of the red monochromatic image, the red filter 27 is kept on the optical path of the printing lens 26 to convert the black-and-white image projected by the printing lens 26 into a red monochromatic image to which the color photographic paper 3 is to be exposed. The shutter 22 is then kept open for a predetermined period of time, for example approximately one second, which has been determined in accordance with the sensitivity of the color photographic paper 3 to red light so as to make a proper exposure, allowing the color photographic paper 3 to be exposed to the projected red monochromatic CRT image.

After the exposure of the red monochromatic CRT image, the green filter 28 replaces the red filter 27 simultaneously with the display of the green monochromatic image as a black-and-white image on the screen of the black-and-white CRT 25. In the same manner as for the red monochromatic CRT image, the color photographic paper 3 is successively exposed to the green and blue monochromatic images. When the exposure of the color photographic paper 3 is thus completed in the three color frame sequence exposure system, the nip rollers 46 advance the color photographic paper 3 by one frame and position an unexposed part hereof between the mask and pressure plates 6 and 7. The exposure of the color photographic paper 3 to the letter plate 35 can be done simultaneously with or separately from exposure to the CRT image. In the latter case, the CRT image is electrically masked so as not to be displayed on the black-and-white CRT 25.

The above-described operations are repeated as many times as required. When a predetermined number of exposures are effected, the color photographic paper 3 is automatically cut off after the last frame, and the exposed part of the color photographic paper 3 is processed by being passed automatically through the developing tank 39, the bleaching and fixing tank 40, the washing tank 41 and the dryer drum 42 in that order, thereby to produce positive composite images thereon. The color photographic paper 3 thus processed is cut off frame-by-frame by the cutter 43 to provide separate prints either with the same composite image or with different composite images.

Figure 5:
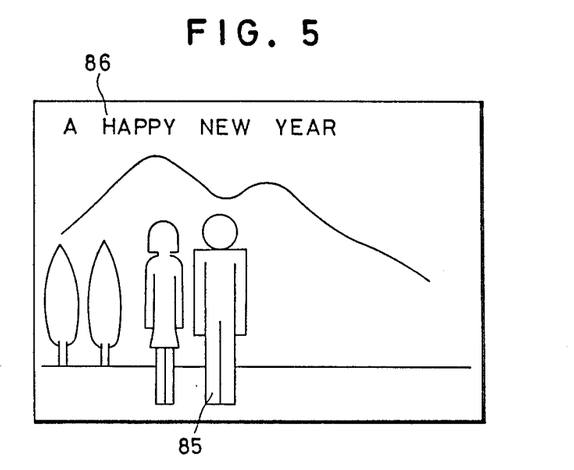
FIG. 5 is a plan view of a print of a composite image which comprises a letter image and a photographic original image.

The print made by the composite image printing apparatus of FIG. 1 is shown in FIG. 5. On the printed surface is a composite image comprising a photographic image 85 formed by the photographic image exposure system and the legend 86 formed by the superimposed CRT image.

Figure 6:
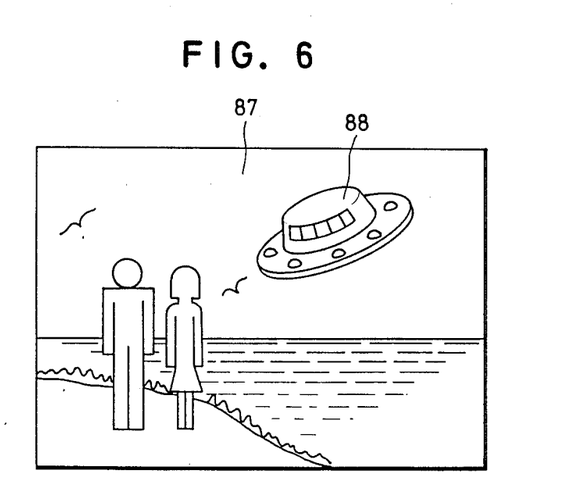
FIG. 6 is a plan view of a print of a composite image which comprises a computer graphic image and a photographic original image.
Figure 7:
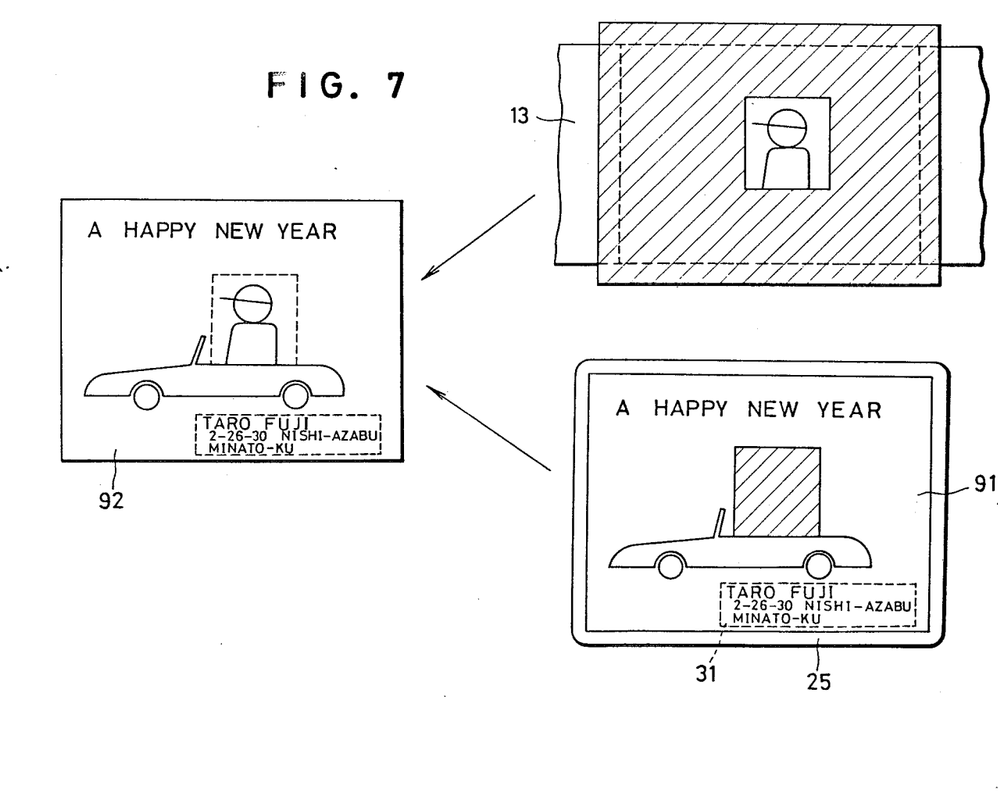
FIG. 7 is an explanatory illustration showing the sequence of making a print of a composite image.

FIG. 6 shows another example of the prints with a composite image comprising a photographic image 87 formed by the photographic image exposure system and a computer graphic image 88 formed by the superimposed CRT image. In the print, the computer graphic image 88, which is located in the sky of the scene of the photographic image 87, is quite distinct.

However, depending on the nature of the scenes of photographic images, the superimposed CRT image can be indistinct. If in fact there is a possibility of indistinctness, the two images are masked for trimming as shown in FIG. 4. That is, the color negative film 13 is masked by the mask 18 of FIG. 4 to cover the shaded area. In accordance with the shaded area of the photographic image, the CRT image 91 on the CRT screen is electrically asked so as to delete the shaded area thereof, which is the same area that is not shaded on film 13. It is desirable to mask electrically the CRT image automatically in cooperation with the operation of the mask 18. It is also desirable to use selectively various kinds of masks formed with different sizes and shapes of openings such as rectangles, circles and so on in addition to or in place of the mask 18. It should e noted in FIG. 7 that a dotted line is drawn only for explanatory purposes, to show a boundary between the two images on the photographic original and the CRT screen that are to be printed on the photographic paper.

Although the present invention has been fully described by way of preferred embodiments thereof with reference to the accompanying drawings, it is to be noted that the possibility of making various changes and modifications will be apparent to those skilled in the art. Therefore, unless otherwise such changes and modifications depart from the true scope of the present invention, they should be construed as being included therein.

What is claimed is:

1. An apparatus for printing a composite image on a photographic paper in an exposure station which comprises:
   means for exposing said photographic paper to an image on a photographic original;
   means including a CRT display device for exposing said photographic paper to a CRT image displayed on the screen of said CRT display device;
   means for sequentially actuating said photographic image exposure means and said CRT image exposure means while said photographic paper remains in said exposure station so as successively to print said photographic and CRT images as a composite image on said photographic paper; and
   means for projecting simultaneously said photographic original image and said CRT image in the form of said composite image onto a monitor screen disposed in a different position from said exposure station.

2. An apparatus as defined in claim 1, wherein said photographic image exposure means is disposed in optical alignment with said exposure station, and said sequentially actuating means includes a mirror removably disposed between said exposure station and said photographic image exposure means in optical alignment with said CRT image exposure means.

3. An apparatus as defined in claim 2, wherein said projecting means is a half-mirror with which the first-mentioned mirror is replaceable.

4. An apparatus for exposing photographic paper in an exposure station to make a print with a composite image, said apparatus comprising:
   photographic image exposure means disposed in optical alignment with said exposure station for exposing said photographic paper to an image on a photographic original;
   CRT image exposure means including a CRT display device in said apparatus for exposing said photographic paper to an image displayed on the screen of said CRT display device;
   means for projecting simultaneously compositely said images on said photographic original and said screen of said CRT display device in the form of said composite image onto a monitor screen disposed in a different position from said exposure station;
   means removably disposed between said exposure station and said photographic image exposure means for successively effecting said photographic paper exposures so as to produce a latent composite image of said images on said photographic original and said screen of said CRT display device on said photographic paper;
   said projecting means and exposure effecting means being replaceable with each other.

5. An apparatus as defined in claim 4, wherein said CRT display device is adapted to reduce its luminosity and said photographic image exposure means includes an illumination source which is dimmed in accordance with said reduction of luminosity, when said images are projected onto said monitor screen.

6. An apparatus as defined in claim 4, wherein said CRT display device is adapted to display on said screen thereof a mirror image relative to said image to be displayed thereon for exposure, when projecting said image onto said monitor screen.

7. An apparatus as defined in claim 4, wherein said photographic image exposure means includes a printing lens whose focal length is variable.

8. An apparatus as defined in claim 4, wherein said photographic image exposure means includes a masking member with a variable aperture for trimming an image to be projected.

9. An apparatus as defined in claim 4, wherein said CRT display device can effect an electrical masking so as to mask unwanted parts of an image to be displayed on said screen thereof.

10. An apparatus as defined in claim 4, wherein said successive exposure effecting means is a mirror.

11. An apparatus as defined in claim 4, wherein said projecting means is a half-mirror.

12. A method of printing a composite image on a photographic paper, which comprises the steps of:
   preparing a photographic original on which photographic images are visually recorded;
   preparing an image on the screen of a CRT display device; and
   exposing the same said photographic paper to said photographic and CRT images in sequence, thereby to print a composite image of said photographic and CRT images thereon.

13. A method as defined in claim 12, which further comprises the steps of:
   electrically masking said CRT image to be compositely printed; and
   mechanically masking said photographic image to be compositely printed, thereby to print said photographic and CRT images on said photographic paper in different locations.

14. A method as defined in claim 12, wherein said CRT image includes at least one of a letter image and a computer graphic image, and said photographic image is a figure image.

15. An apparatus for printing a composite image on a photographic paper in an exposure station which comprises:
   means for exposing said photographic paper to an image on a photographic original;
   means including a CRT display device for exposing said photographic paper to a CRT image displayed on the screen of said CRT display device;
   means for sequentially actuating said photographic image exposure means and said CRT image exposure means while said ppotographic paper remains in said exposure station so as successively to print said photographic and CRT images as a composite image on said photographic paper; and
   a plate with letters which is removably attachable to said screen of said CRT display device.

16. An apparatus as defined in claim 15, wherein said plate is a lithographic film.

* * * * *

UNITED STATES PATENT AND TRADEMARK OFFICE
CERTIFICATE OF CORRECTION

PATENT NO. : 4,786,944

DATED : November 22, 1988

INVENTOR(S) : Kiichiro Sakamoto et al.

It is certified that error appears in the above-identified patent and that said Letters Patent is hereby corrected as shown below:

On the title page, Item [75], "Liyoshi Yamaguchi" should read
-- Kiyoshi Yamaguchi --.

Signed and Sealed this

Twentieth Day of June, 1989

Attest:

DONALD J. QUIGG

Attesting Officer

Commissioner of Patents and Trademarks